Nov. 1, 1949     H. P. RANSBURG ET AL     2,486,877
OVERSPRAY RECOVERY FOR SPRAY BOOTHS
Filed Dec. 30, 1943     3 Sheets-Sheet 1
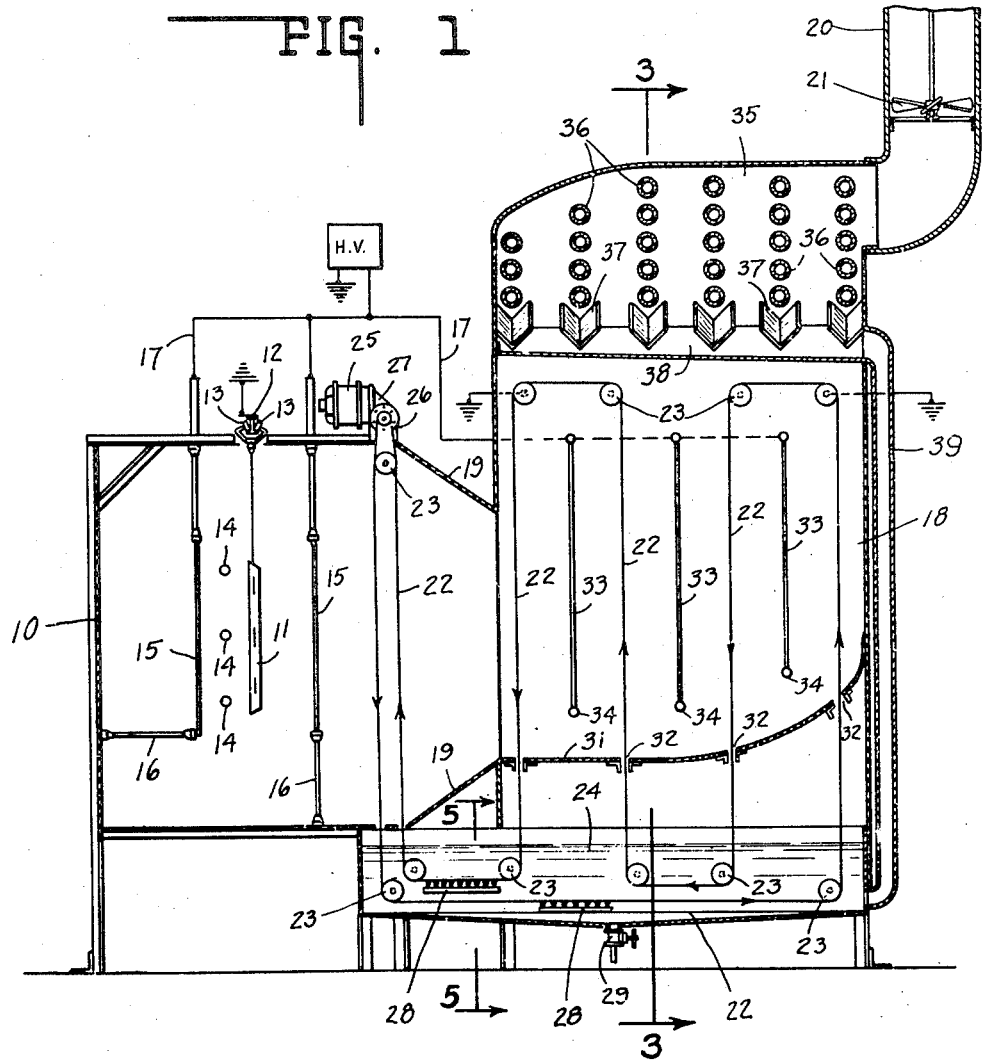
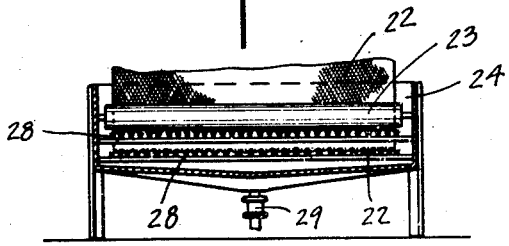
INVENTORS.
HAROLD P. RANSBURG.
EMERY P. MILLER.
BY Lockwood, Goldsmith & Galt.
ATTORNEYS.

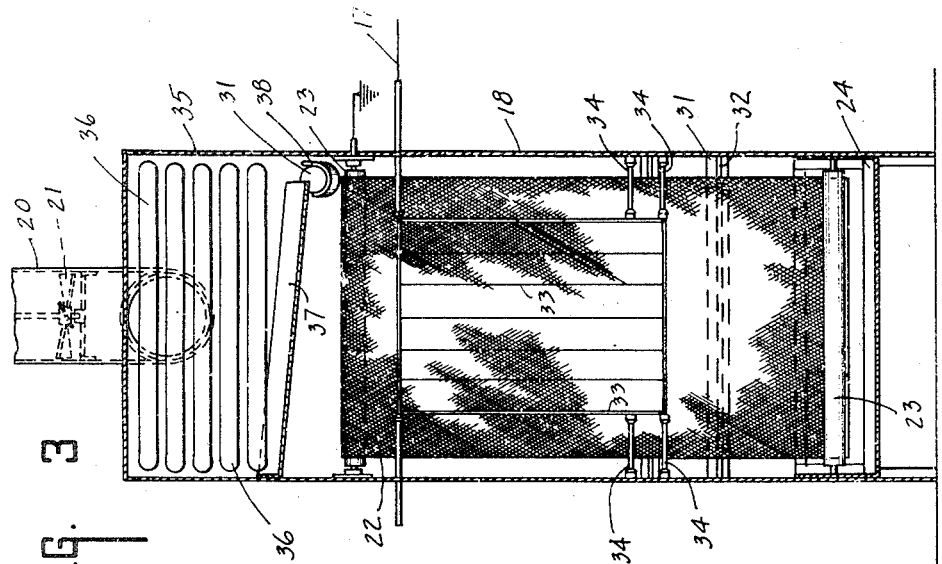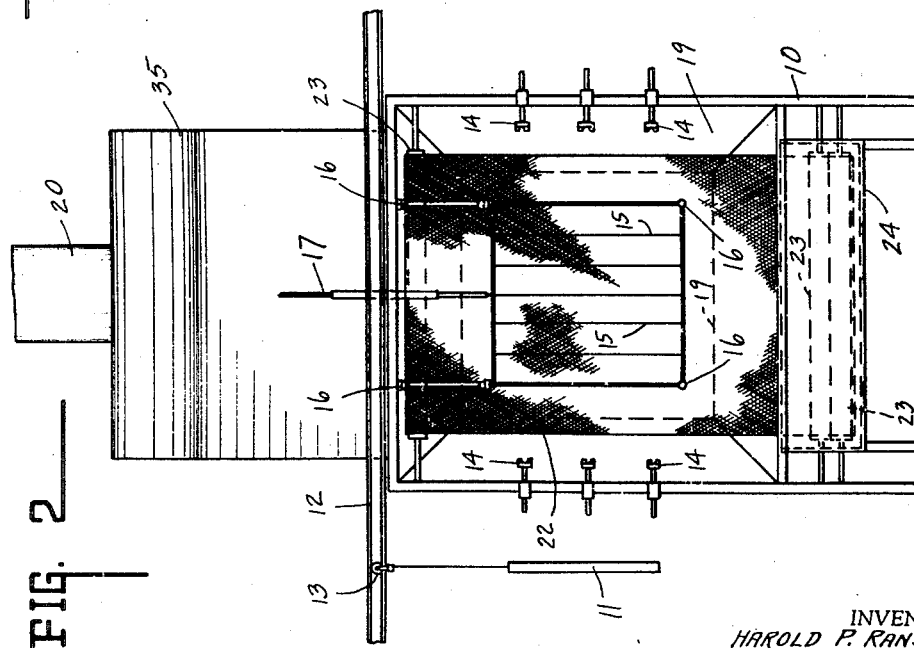

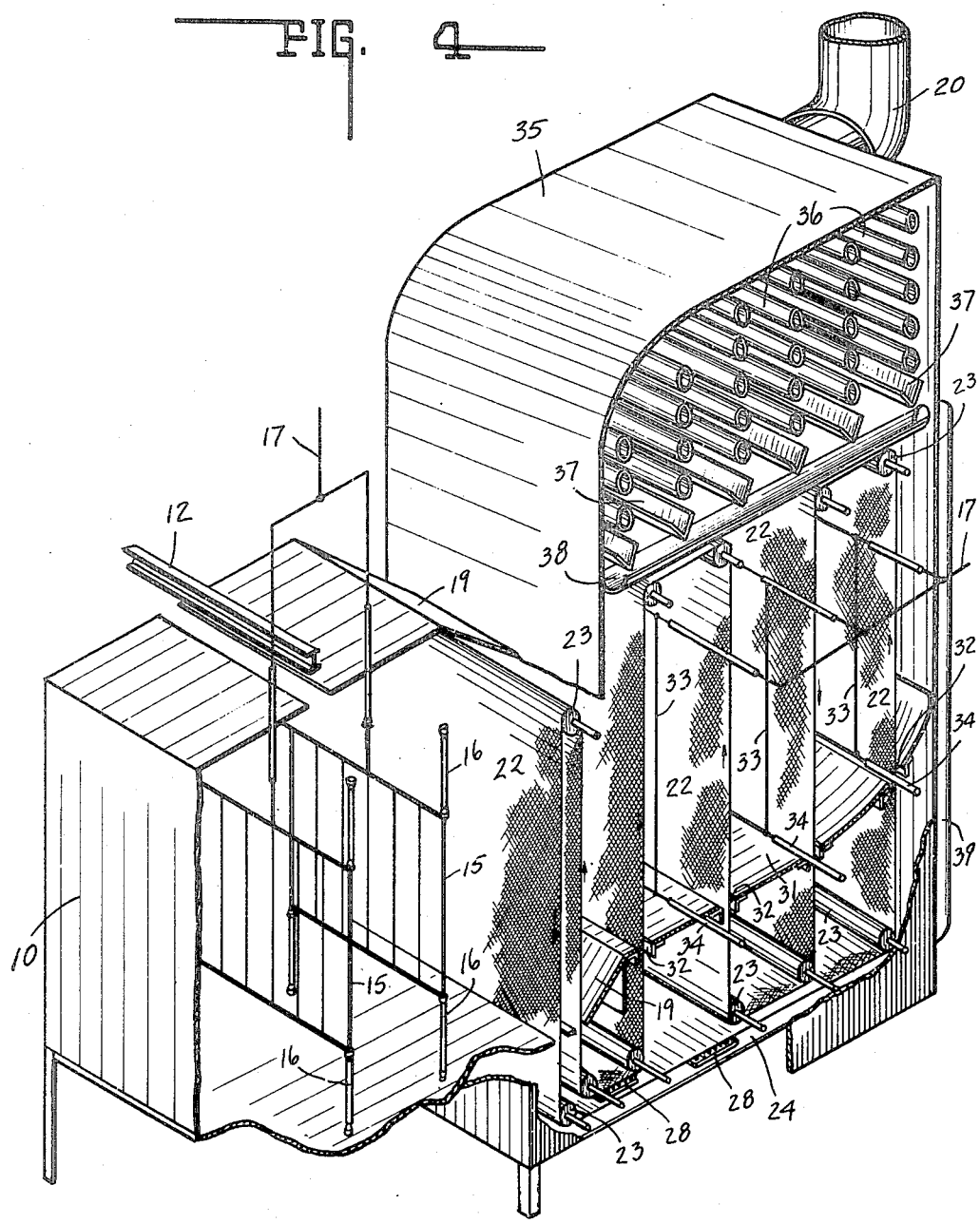

Patented Nov. 1, 1949

2,486,877

UNITED STATES PATENT OFFICE 2,486,877

OVERSPRAY RECOVERY FOR SPRAY BOOTHS

Harold P. Ransburg and Emery P. Miller, Indianapolis, Ind., assignors, by mesne assignments, to Ransburg Electro-Coating Corp., Indianapolis, Ind., a corporation of Indiana Application December 30, 1943, Serial No. 516,256

4 Claims. (Cl. 183—7)

This invention relates to the recovery of solids and solvents from the overspray of a spray booth in which a spray coating, such as paint or lacquer, is discharged in a fine mist by a spray gun, and particularly for reclaiming that part of the coating and solvent not deposited upon the article, but which would otherwise be lost through a forced draft exhaust.

The invention is further applicable for use in connection with spray coating articles in an electrostatic field, such as disclosed and referred to in Letters Patent No. 2,247,963, issued July 1, 1941, on an application filed by Harold P. Ransburg and Harry J. Green, entitled "Apparatus for spray coating articles."

This invention is directed to the reclaiming of coating solids and their carrying solvent by providing a series of movable collecting screens between the spray booth and the exhaust upon which said coating solids may be collected, and continuously subjecting said screens to a washing bath of the solvent derived from the condensation and precipitation thereof after being relieved of the solids carried thereby. Thereupon the solvent bath may be withdrawn for use as a thinner, or the solids removed thereby or otherwise reclaimed.

A further feature of the invention resides in effecting a collection of the solids on the moving collecting screens by electrostatic action. For this purpose an electrostatic field is created between suitable discharge electrodes and a series of metal collecting screens. To this end, the electrodes and screens are connected with a source of high voltage, and their respective polarities so arranged that the electrostatic lines of force will cause the coating solids to be attracted by and collected upon said screens.

A further feature of the invention resides in removing the solids collected on the screens by continuously passing the screens through a solvent bath maintained by condensation and precipitation of the freed solvent. Thus, both the solids and their carrying solvent are recovered from the overspray, being each separated from the spray before it is exhausted, the solvent being again utilized for the removal and carrying of the solids.

The full nature of the invention will be understood from the accompanying drawings and the following description and claims:

Fig. 1 is a central vertical section through the apparatus in association with an electrostatic spray booth. Fig. 2 is a front elevation of the spray booth with front wall removed. Fig. 3 is a section taken on the line 3—3 of Fig. 1. Fig. 4 is a diagrammatic illustration in perspective showing the arrangement of electrodes and moving collector screens. Fig. 5 is a section taken on the line 5—5 of Fig. 1.

In the drawings there is shown for purpose of illustration, a spray booth 10 in which articles 11 are coated, such as with a paint, lacquer or the like discharged from the usual spray gun. The spray booth may be of the ordinary type for hand spraying in normal atmosphere, or, as shown herein for purposes of illustration, it may be of the type for electrostatic coating, as more particularly and fully set forth and described in the above-mentioned Letters Patent.

Extending across the top of the spray booth 10 there is an angle track 12 from which the articles 11 are suspended and caused to travel through the booth on the supporting rollers 13. Adjacent and to one side of the line of travel of the articles therethrough and mounted in the wall of the booth, there are a series of adjustable fixed spray guns 14 through which an atomized coating material is sprayed into the booth for deposit on the surface of the articles to be coated.

An electrostatic field into which the coating is sprayed is provided by a series of high voltage discharge electrodes 15 mounted in the booth by the insulating supports 16 so as to be spaced on one or both sides of the line of travel of the articles 11. By this arrangement, articles 11 constitute the opposite electrode, preferably being grounded through the track 12, said track being connected through the ground with one side of the source of high voltage, whereas the electrodes 15 are connected with the opposite side of said source through insulated lead wires 17. The coating is, therefore, sprayed in a fine mist into the atmosphere of the booth or the electrostatic field, as the case may be, that portion thereof not precipitated upon the articles coated being drawn from the booth by a forced draft through the following described apparatus for reclaiming it.

The reclaiming apparatus comprises a housing 18 having a funnel-shaped intake 19 communicating with the spray booth 10, and having a discharge chimney 20 communicating with the upper end thereof. In communication with the discharge portion of the housing there is provided the usual motor driven exhaust fan 21, whereby a forced draft is created to draw off the gases comprising air laden solvent and coating solids from the spray booth through or about the collecting screens to be hereinafter described, the solids being thereby separated from the solvent, and the solvent precipitated, leaving the air relieved thereof to be discharged through the exhaust chimney.

For first removing solid and liquid particles from the overspray drawn through the housing 18, an endless moving collecting screen is provided, preferably made of woven electrical conducting metal mesh, such as to permit passage of the overspray therethrough while permitting deposit thereon of the solids carried thereby. The endless screen 22 is carried in and about the interior of the housing 18 and intermediate to the intake thereof and the spray booth 10 by a series of suitably positioned carrying rollers 23. Said rollers have their bearings in the side walls of the housing and its intake portion for free rotation as the screen is caused to pass thereabout. They are so arranged that the screen moves up and down across the intake opening, passing through a solvent containing tank 24 and up and down within the chamber of the housing so that the overspray carrying the coating solids will be drawn through and over several portions of the screen in succession.

The screen is driven by a motor 25 through a driving belt 26 engaging a suitable pulley on one of the rollers 23, said belt driven roller having sufficient frictional engagement with the screen for driving the same about the remaining rollers at a low speed. For this purpose suitable reduction gearing between the motor and the driving belt is provided in a gear box 27. At the bottom of the housing the screen is carried by said rollers so as to pass through the recovered solvent contained in the tank 24 where its surface is engaged by a series of cleaning brushes 28. The deposited and accumulated coating solids carried by the screen are loosened and washed by the solvent and brushed therefrom by said brushes as the same passes through the solvent tank. A suitable outlet 29 is provided at the bottom of the tank for draining the solvent with the accumulated solids carried thereby from which the solids may be reclaimed or the solution used for thinning purposes as may be desired.

The collecting chamber of the housing communicates with the spray booth through the passage indicated at 19 across which a section of the collecting screen passes, said chamber extending above the solvent tank and an upwardly curved bottom plate 31. Said bottom plate is provided with slots 32 through which the moving screen may pass.

The deposit of the coating solids on the moving screen is facilitated and rendered more effective by creating within the housing an electrostatic field such as to cause the charged solids to be directed toward and be attracted by the screen. For this purpose there are provided a series of high voltage discharge electrodes 33 supported in spaced relation to intermediate and adjacent parallel portions of the screen. Said electrodes are supported by suitable insulators 34 and connected to the lead-in line 17 leading from one terminal of a source of high voltage. The filter screen and the other terminal of the high voltage source are grounded, the polarity of the electrodes and screen being correspondingly arranged to that of the electrodes and article to be coated in the spray booth. Thus, wherein the reclaiming apparatus is associated with an electrostatic spray booth, the electrodes of both the booth and the filter are connected in parallel with the line 17, and the articles to be sprayed and the collecting screen are grounded. The potential difference maintained by the high-voltage source between the electrodes 33 and the screen is well below the minimum voltage which would be required to create a flash-over, but is still high enough to create over the electrodes 33 a corona discharge which will be highly effective in imparting to solid and liquid particles charges opposite in sign to that of the screens.

From the foregoing it will be observed that the overspray not deposited upon the article to be coated will be drawn through or over the collecting screens which will act to attract and separate the oversprayed solids and solvent from their carrying air stream, and carry them to the solvent bath whereby they may be removed and reclaimed. This separation is further facilitated and rendered more complete in its effectiveness by the action of the electrostatic field through which the overspray passes. The electrostatic field will direct and attract additional material to the grounded metal screen for deposit thereon. However, upon the screen passing from the electrostatic field into the solvent bath, such deposited coating solids may be readily dissolved and brushed therefrom for reclaiming as a thinner or otherwise.

The overspray, including the solvent freed of solids, passes through a refrigerated condensation chamber indicated at 35 in the upper portion of the housing 18. Said chamber carries a series of refrigerating coils 36 arranged for contact by the freed overspray or solvent laden air. Such contact on the refrigerated surfaces of the coils 36 causes separation of solvent vapor from the air and its condensation on the surfaces of the coils down which it drains to the drip pans 37. Said drip pans are sloped to discharge the condensed solvent into a collecting trough 38 which empties into a down spout 39 leading to the lower portion of the solvent containing tank 24. Thus, a large percentage of the solvent is condensed and reclaimed from the overspray, the air or gases substantially freed therefrom being discharged through the exhaust chimney 20. The recovered solvent is fed back into the solvent tank for use in removing the solids from the collector screens and to again act as a carrier therefor.

The invention claimed is:

1. In gas-treating apparatus, a duct, an endless, flexible, foraminous screen, a screen-cleaning bath including a volatile solvent, means supporting said screen for movement over a path including a first stretch extending transversely of said duct and a second stretch located within said bath, means for moving said screen over such path, means for causing gases to be treated to flow through said duct and first screen-stretch, a discharge electrode associated with said first screen-stretch, means for maintaining between said electrode and first screen stretch a potential difference well below that which would cause flash-over but high enough to create a corona discharge adjacent said electrode, and means located in said duct posterior to said screen for condensing solvent volatilized from said screen and returning it to said bath.

2. In gas treating apparatus, a duct; a foraminous screen, a screen-cleaning bath including a volatile solvent, means supporting said screen for movement between a position within said bath and a position in which it extends transversely of said duct, means for moving said screen between such two positions, means for causing gases to be treated to flow through said duct and screen, a discharge electrode in said duct, means for maintaining between said electrode and screen a potential difference well below that which would cause flash-over but high enough to create a corona discharge adjacent said electrode, and means located in said duct posterior to said screen for condensing solvent volatilized from said screen and returning it to said bath.

3. In gas-treating apparatus, a duct, a foraminous screen extending transversely of said duct, gas-cooling means located in said duct posterior to said screen, means for collecting volatile solvent condensed by said cooling means and for applying it to said screen, a discharge electrode in said duct, and means for maintaining between said screen and electrode a potential difference well below that which would cause flash-over but high enough to create a corona discharge adjacent said electrode.

4. In gas-treating apparatus, a chamber having an exhaust opening near its top and an inlet opening in a side wall and below said exhaust opening, gas-cooling means in the upper part of said chamber, a plurality of horizontally spaced, generally vertical foraminous screen disposed in said chamber under said cooling means and opposite said inlet opening, a discharge electrode located in said chamber opposite one of said screens, means for maintaining a potential difference between said electrode and the screen opposite it, means for causing gases to be treated to flow through said chamber, and means for collecting liquid condensed by said cooling means.

HAROLD P. RANSBURG.
EMERY P. MILLER.

REFERENCES CITED

The following references are of record in the file of this patent:

UNITED STATES PATENTS

| Number | Name | Date |
|---|---|---|
| 1,307,656 | Camberos et al. | June 24, 1919 |
| 1,358,030 | Smith | Nov. 9, 1920 |
| 1,422,182 | Curme, Jr. | Nov. 10, 1927 |
| 1,444,092 | Anderson et al. | Feb. 6, 1923 |
| 1,479,271 | Wolcott | Jan. 1, 1924 |
| 1,575,165 | Hopkinson | Mar. 2, 1926 |
| 1,752,920 | McCloskey | Apr. 1, 1930 |
| 1,822,074 | Winchester | Sept. 8, 1931 |
| 1,846,365 | Seipp | Feb. 23, 1932 |
| 1,947,447 | Brassert et al. | Feb. 20, 1934 |
| 2,100,155 | Beran | Nov. 23, 1937 |
| 2,172,304 | Wintermute | Sept. 5, 1939 |
| 2,227,481 | Bates | Jan. 7, 1941 |
| 2,319,082 | Nestor | Mar. 11, 1943 |

FOREIGN PATENTS

| Number | Country | Date |
|---|---|---|
| 96,319 | Switzerland | Oct. 2, 1922 |
| 452,437 | Germany | Nov. 10, 1927 |
| 513,836 | France | Feb. 24, 1921 |